United States Patent [19]

Burckhardt et al.

[11] 4,079,352
[45] * Mar. 14, 1978

[54] ECHO SOUNDING TECHNIQUE

[75] Inventors: Christoph Benedikt Burckhardt, Muttenz; Pierre-André Grandechamp, Arlesheim, both of Switzerland; Heinz Hoffmann, Grenzach, Germany

[73] Assignee: Hoffmann-La Roche, Inc., Nutley, N.J.

[*] Notice: The portion of the term of this patent subsequent to Jan. 17, 1995, has been disclaimed.

[21] Appl. No.: 771,220

[22] Filed: Feb. 23, 1977

Related U.S. Application Data

[63] Continuation of Ser. No. 628,861, Nov. 5, 1975, abandoned, which is a continuation of Ser. No. 418,326, Nov. 23, 1973, abandoned.

[30] Foreign Application Priority Data

Nov. 27, 1972 Switzerland .................. 17222/72

[51] Int. Cl.² .......................... G01S 9/66; G01S 7/66
[52] U.S. Cl. .................................................. 340/1 R
[58] Field of Search ................ 340/1 R, 3 R, 5 R, 10, 340/15; 73/67.8 R, 67.8 S

[56] References Cited

U.S. PATENT DOCUMENTS 3,086,195  4/1963  Halliday ................................. 340/15

*Primary Examiner*—Richard A. Farley
*Attorney, Agent, or Firm*—Samuel L. Welt; George M. Gould; Mark L. Hopkins

[57] ABSTRACT

An ultrasonic echo sounding technique for reducing unwanted echoes from reflectors outside the focal line of a focused ultrasonic field is disclosed. In this technique at least two pulse-defined ultrasonic waves are successively transmitted. The amplitudes of the said waves are functions of an angle $\phi$ which is generated about the axis of the source of ultrasound. Echoes from the reflected waves are received from reflectors both on and outside the focal line and multiplied by an amplitude factor which is a function of the above mentioned angle $\phi$. Echo signals associated with echoes having the same transit time are then added together.

10 Claims, 7 Drawing Figures

FIG. 6
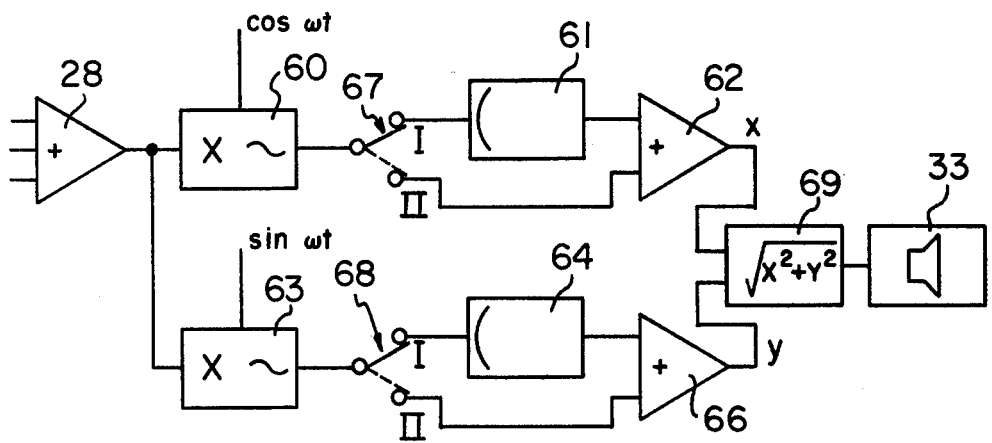
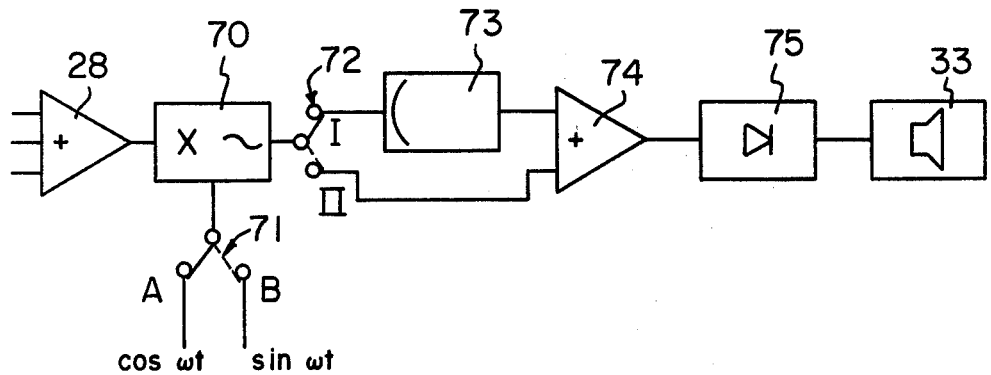
FIG. 7

ECHO SOUNDING TECHNIQUE

This is a continuation of application Ser. No. 628,861 filed Nov. 5, 1975, now abandoned.

BACKGROUND OF THE INVENTION

The invention relates to a method for reducing the echoes from reflectors which are disposed outside the focal line in an echo sounding method having a convergent ultrasonic field of substantially annular cross-section and an apparatus for carrying out said method.

DESCRIPTION OF THE PRIOR ART

Echo sounding methods which employ a convergent ultrasonic field with a substantially annular cross-section provide good focusing of the ultrasonic field over a considerable depth. However, it has been found that relatively large lateral maxima occur when using an ultrasonic wave which is in phase over its entire cross-section and has a constant amplitude, that is to say undesirable echoes resulting from reflectors which are disposed laterally of the focal line, may have a relatively large amplitude.

It is an object of the present invention to avoid this disadvantage by reducing the lateral maxima.

SUMMARY OF THE INVENTION

According to the present invention therefore there is provided a method for reducing the echoes from reflectors outside the focal line in an echo-sounding method with a convergent ultrasonic field having a substantially annular cross-section, which comprises successively transmitting at least two pulse-defined ultrasonic waves, the amplitudes of said waves being functions of an angle $\phi$ said angle lying in the plane of the said cross-section and being generated about the axis of said cross-section, receiving echoes from reflectors both in the focal line and outside thereof, converting said echoes into electrical echo signals, multiplying said echo signals by an amplitude factor which is a function of the angle $\phi$, and subsequently adding together the echo signals which are associated with echoes having the same transit time.

The apparatus for carrying out this method preferably comprises a substantially annular ultrasonic transducer which is assembled from a plurality of identically sized segmental transducer elements whose radiation surfaces are inclined towards the axis of the annulus, a transmitter circuit with a generator and a group of switches for the optional connection of selected transducer elements to the generator or to earth, a receiver circuit with an adding circuit, a rectifying circuit, an optionally switched store device for storing pulses received earlier, a second adding circuit, a display device or recording device and a group of simultaneously actuated switches for the optional connection of selected transducer elements or earth to the first adding circuit.

DETAILED DESCRIPTION OF THE INVENTION

The principle of the method according to the invention can be generally described on the basis of the theoretical considerations which are outlined below. A first pulse is transmitted with an amplitude distribution $\alpha_{s1}(\phi)$ which is defined by the following expression:

$$\alpha_{s1}(\phi) = (1 + \sqrt{2} \cos 2\phi)$$

where $\phi$ is the angular position of a point in the cross-section or on the annular transducer. On reception, the said echoes of the first pulse are multiplied by the amplitude factor $\alpha_{E1}(\phi)$ where $$\alpha_{E1}(\phi) = (1 - \sqrt{2} \cos 2\phi).$$

The echo $S_1(r)$ of a point shaped reflector will then be expressed by $$S_1(r) \sim J_0^2(cr) - 2 J_2^2(cr) \cos^2 2\phi$$

where $J_0$ is the zero order Bessel function, $J_2$ being the second order Bessel function, $c$ being a constant and $r$ being the distance between the point shaped reflector and the axis of the annular transducer.

A second pulse is then transmitted with the amplitude distribution $\alpha_{s2}(\phi)$ which is defined by the following expression $$\alpha_{s2}(\phi) = (1 + \sqrt{2} \cos [2\phi + 90°]).$$

The echoes of this said pulse are multiplied by the amplitude factor $$\alpha_{E2}(\phi) = (1 - 2 \cos [2\phi + 90°]).$$

The echo $S_2(r)$ of a point shaped reflector will then be $$S_2(r) \sim J_0^2(cr) - 2 J_2^2(cr) \cos^2 [2\phi + 90°].$$

The total is obtained by the addition of the two echo signals, that is to say $$S_{tot}(r) = S_1(r) + S_2(r) = 2 [J_0^2(cr) - J_2^2(cr)].$$

This is the desired point spread function. This simple example shows that the two amplitude weightings are selected so that the term which depends on the angle disappears at the end since the point spread function is not to be dependent on an angle.

It can be shown that a better point spread function can be obtained if additional Bessel functions of a higher order are used for the synthesis. To this end two additional pulses with the appropriate amplitude weightings are necessary for each additional term.

Operation with quantized amplitude weighting is a particularly simple form of the method according to the invention. In such a method selected segments of an annular transducer oscillate at amplitude A and in phase while the remaining segments do not oscillate. Reception is performed with the segments which are not driven during transmission while the other segments are not taken into account.

BRIEF DESCRIPTION OF THE DRAWINGS

Preferred embodiments of the invention are explained below with reference to the accompanying drawings in which:

FIGS. 6 and 7 are modifications of the receiver circuit.

DESCRIPTION OF A PREFERRED EMBODIMENT OF THE INVENTION

Figure 1:
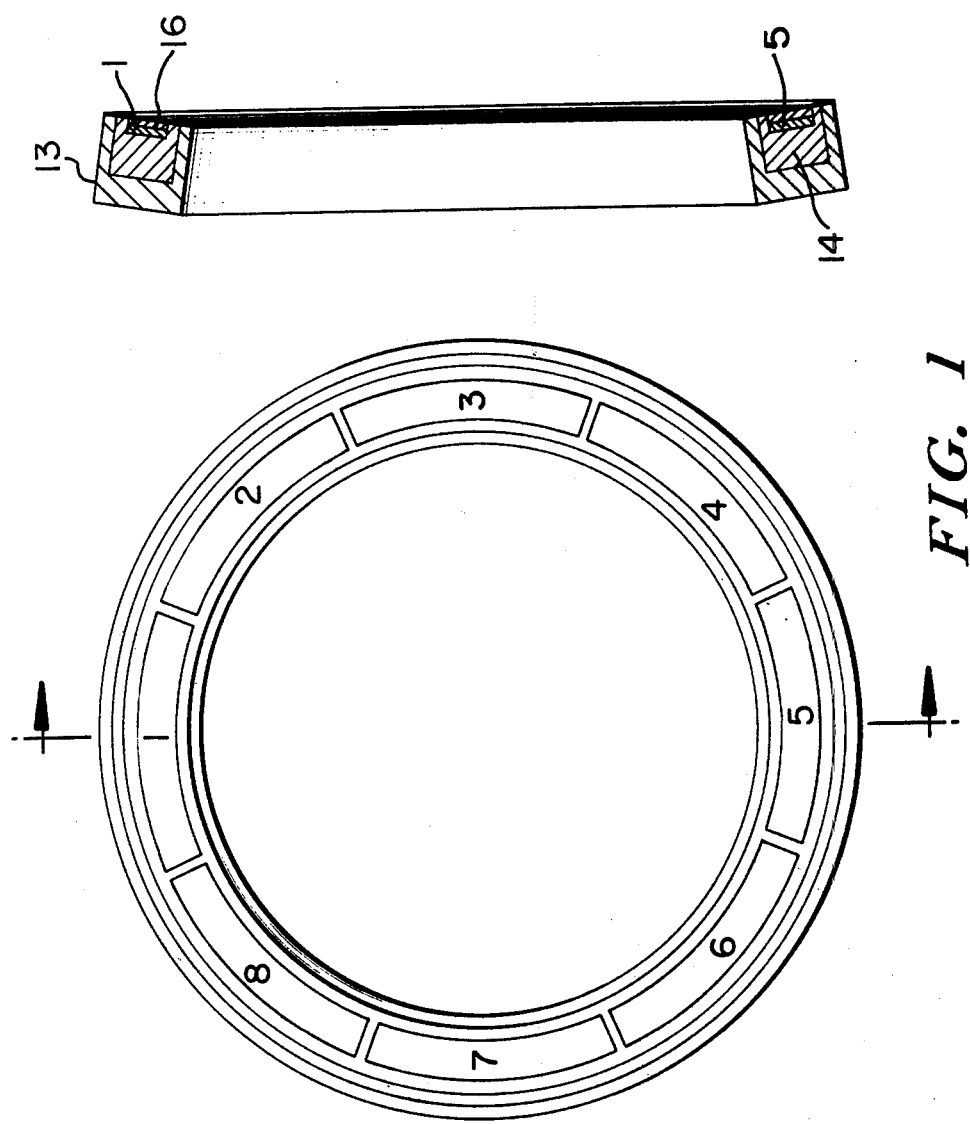
FIG. 1 shows an annular ultrasonic transducer comprising eight segmental elements.

The annular ultrasonic transducer illustrated in FIG. 1 is provided with a ring shaped casing 13 of substantially U-shaped cross-section, the axis of symmetry of the cross-section being inclined with respect to the ring axis and intersecting it at a specific distance. The open side of the U-shaped cross-section is nearest to the aforementioned point of intersection and therefore nearest to the ring axis. Eight segmental transducer elements 1 to 8 which together form a ring are disposed in the annular indentation of the casing 13. The said transducer element comprises a piezo electric element which is applied to an antivibration block 14 of epoxy resin/tungsten. A metallic stratum, which is vacuum coated on the front and is connected to the casing 13, and individual connecting leads (not shown), which extend through bores in the casing and in the antivibration blocks to the rear sides of the piezo electric elements, are provided for connecting the transducer elements. A stratum 16 of epoxy resin is provided to adapt the sound impedance to water and to give a mechanical protection to the piezo electric resonator.

In operation each piezo electric resonator transmits an ultrasonic beam. The ultrasonic field produced in this manner is focused at a specific distance from the ultrasonic transducer on the ring axis in a focal line. The length of focal line defines the depth to which good lateral resolution is obtained. The distance of the focal line from the ultrasonic transducer is defined substantially by the angle of inclination of the piezo electric resonators with respect to the ring axis. The length of the focal line is defined mainly by the width of the piezo electric resonator. The shape of the ultrasonic field which is transmitted by the piezo electric resonators can be characterized by the sectional surface which it forms with any desired plane which is perpendicular to the axis and is disposed, for example, between the transducer and the focal line, the said plane being referred to hereinbelow as the cross-section of the ultrasonic field. The said cross-section in the present case is substantially annular, the diameter of the ring diminishing steadily as far as the focal line with an increasing distance from the transducer.

Figure 2:
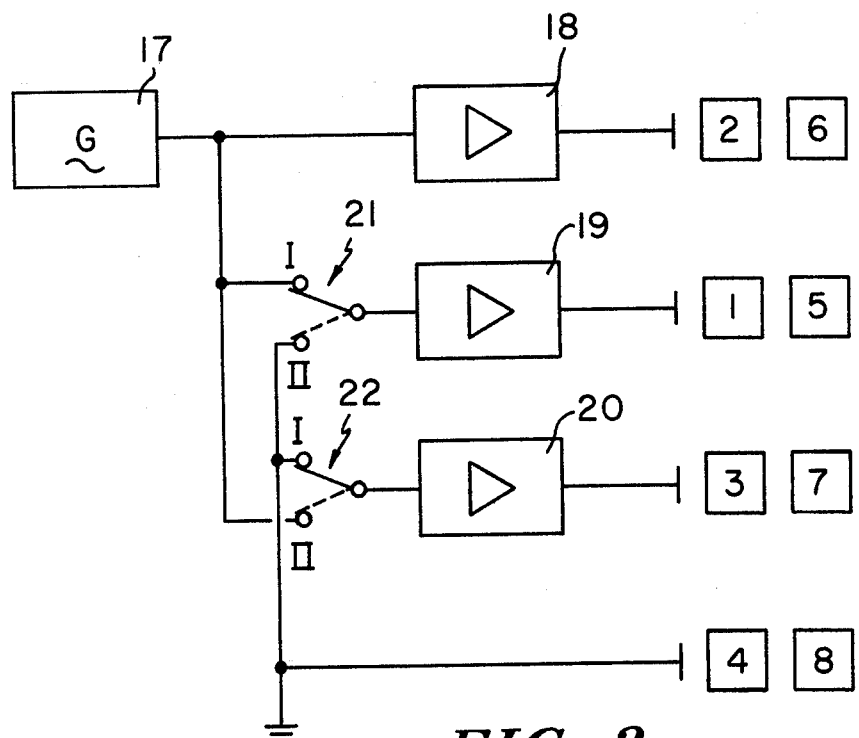
FIG. 2 is a block diagram of a transmitter circuit for driving the eight-part ultrasonic transducer.

The transducer elements 1 to 8 of a block diagram of a transmission circuit shown in FIG. 2 are indicated only symbolically by their numbers in the blocks. The signal which drives the transducer elements is produced by a generator 17 which may contain a circuit to control its timing or may be connected to such a circuit. The generator 17 is connected to an amplifier 18 and is also connected through two switches 21 and 22 to amplifiers 19 and 20. The amplifiers 18 to 20 are directly connected to every two of the transducer elements, namely the amplifier 18 to the transducer elements 2 and 6 and the amplifier 19 to the transducer elements 1 and 5, the amplifier 20 being connected to the transducer elements 3 and 7. The two switches 21 and 22 have two switch positions in one of which they connect the associated amplifier input to the generator 17 and in the other of which they earth the appropriate amplifier input. The two switches 21 and 22 are simultaneously operated, the input of the amplifier 19 being connected to the generator 17 and the input of the amplifier 20 is earthed in the switch positions designated with I while the connections are reversed in the switch position designated with II, that is to say the input of the amplifier 20 is connected to the generator and the input of the amplifier 19 is connected to earth. The switches 21 and 22 may comprise electric circuit elements, for example field effect transistors which are connected to the timer (not shown) contained in the generator 17 for the purpose of changeover. The two remaining transducer elements 4 and 8 are earthed during transmission.

Figure 3:
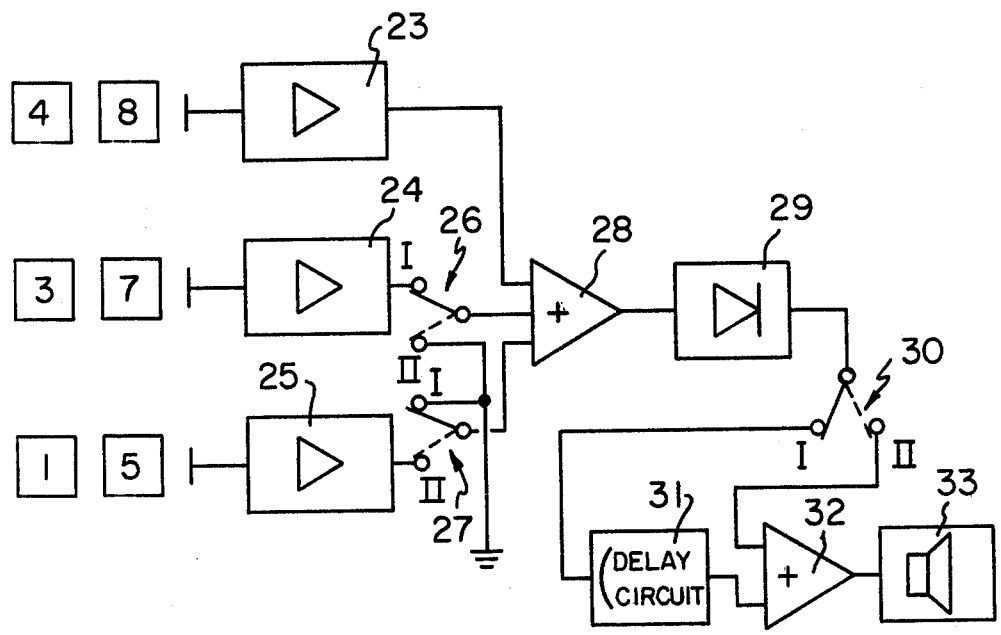
FIG. 3 is a block diagram of a receiver circuit for an eight-part ultrasonic transducer.

The transducer elements are also provided for receiving reflected ultrasonic waves. As shown in FIG. 3 they are connected to the amplifiers 23 to 25 in the same grouping as for transmission but the transducer elements 2 and 6 are not taken into account. The amplifier 23 is connected directly to an adding circuit 28 and the amplifiers 24 and 25 are connected via switches 26 and 27 to an adding circuit 28. The switches 26 and 27 also have two switch positions and are switched simultaneously with the switches 21 and 22 of the transmission circuit. When the switch 26 is in the switch position designated I the associated input of the adding circuit 28 will be connected to the amplifier 24 while in the switch position designated II it will be connected to earth. Conversely the associated input of the adding circuit 28 is connected to earth when the switch 27 is in the switch position designated I while the said input is connected to the amplifier 25 when the switch is in the position designated II. The output of the adding circuit 28 is connected via a rectifier circuit 29 to a switch 30 which has two switch positions I and II. The switch 30 is also switched simultaneously with the switches 26 and 27 as well as with the switches 21 and 22. With the switch in position I the output of the rectifier circuit 29 is connected via a delay circuit 31 to one input of an adding circuit 32 while the output of the rectifier circuit 29 is connected directly to a second input of the adding circuit 32 when the switch 30 is in the switch position II. A cathoderay oscilloscope 33 is connected to the output of the adding circuit 32.

The method of operation of the system comprising the eight-part, annular ultrasonic transducer, the transmitter circuit and the receiver circuit is as follows: All switches of the transmitter circuit and of the receiver circuit are initially in the switch position I. A pulse-defined signal which is produced by the generator 17 passes via the amplifiers 18 and 19 to the transducer elements 1, 2, 5 and 6. The other transducer elements are not driven. The ultrasonic transducer therefore transmits an ultrasonic field which has a specific amplitude A and is in phase in the cross-section sectors which are associated with the transducer elements 1, 2, 5 and 6 while in the remaining sectors it has the value 0. Reflected ultrasonic waves are received again by the transducer elements but only the echo signals which are received by the transducer elements 3, 4, 7 and 8 are supplied via the amplifiers 23 and 24 to the adding circuit 28. The signal which is produced by addition is rectified in the rectifier circuit 29 and is fed via the switch 30 into the delay circuit 31. The signal leaves the delay circuit 31 only when the echo signal of a further transmitted pulse has arrived.

All the switches 21, 22, 26, 27 and 30 are then switched into position II. After changeover switching the generator 17 supplies a further pulse-defined signal which drives the transducer elements 2, 3, 6 and 7 in the manner corresponding to that of the first signal but the remaining transducer elements are not driven. The echo signals obtained by the transducer elements 1, 4, 5 and 8 in the receiver circuit are then added in the adding circuit 28 and after rectification in the rectifier circuit 29 the added signal is supplied directly via the switch 30 to one input of the adding circuit 32. As already mentioned the first echo signal leaves the delay circuit 31 at the same time and enters into the second input of the adding circuit 32. The added signal is displayed on the cathode ray oscilloscope 33.

The principle of the method described above with quantized amplitude weighting can be theroetically described, the amplitudes assuming the standardizing values 1 or 0. The amplitude distributions for the transmitted and the received ultrasonic field can be expressed as Fourier series. The amplitude distribution $a_{s1}(\phi)$ of the transmitted ultrasonic field is expressed by $$a_{S1}(\phi) = \frac{2}{\pi} [\frac{\pi}{4} + \cos 2\phi - \frac{1}{3} \cos 6\phi + \ldots - \ldots]$$

$$= \frac{1}{2} + \frac{2}{\pi} \cos 2\phi - \frac{2}{3\pi} \cos 6\phi + \ldots - \ldots$$

The received signal is multiplied with an amplitude factor $a_{E1}(100)$ which takes the following form:

$$a_{E1}(\phi) = \frac{1}{2} - \frac{2}{\pi} \cos 2\phi + \frac{2}{3\pi} \cos 6\phi - \ldots + \ldots$$

The echo of a point shaped reflector is therefore $$S_1(r) = \frac{1}{4} J_o^2(cr) - \frac{4}{\pi^2} J_2^2(cr) \cos^2 2\phi +$$

$$+ \frac{8}{3\pi^2} J_2(cr) J_6(cr) \cos 6\phi \cos 2\phi + \ldots - \ldots$$

The second pulse is then transmitted with the amplitude distribution $$a_{S2}(\phi) = \frac{1}{2} + \frac{2}{\pi} \cos(2\phi + 90°) - \frac{2}{3\pi} \cos(6\phi + 270°)$$

$$= \frac{1}{2} - \frac{2}{\pi} \sin 2\phi - \frac{2}{3\pi} \sin 6\phi - \cdots$$

The received echoes are multiplied with the amplitude factor $a_{E2}(\phi)$ that is to say $$a_{E2}(\phi) = \frac{1}{2} + \frac{2}{\pi} \sin 2\phi + \frac{2}{3\pi} \sin 6\phi + \ldots$$

The echo of a point shaped reflector for the second pulse therefore amounts to $$S_2(r) = \frac{1}{4} J_0^2(cr) - \frac{4}{\pi^2} J_2^2(cr) \sin^2 2\phi -$$

$$- \frac{8}{3\pi^2} J_2(cr) J_6(cr) \sin 2\phi \sin 6\phi + \ldots$$

The total signal is obtained by the addition of the two individual signals, that is to say $$S_{tot}(r) = \frac{1}{2} J_0^2(cr) - \frac{4}{\pi^2} J_2^2(cr) +$$

$$\frac{8}{3\pi^2} J_2(cr) J_6(cr) \cos 8\phi + \ldots$$

In the preceding terms $J_0$, $J_2$, $J_6$ refer to the zero, second and sixth order Bessel functions. It can be seen that the expression is independent of angles as far as the second term. The third cross term, which is angle-dependent, interferes. However, it causes relatively small lateral maxima which have positive as well as negative values.

An improvement can be obtained with a method which utilizes a 12 part annular transducer. The fact that three pulses are necessary for obtaining the total signal is a disadvantage by comparison with the previously described method. However, the improvement is still obtained due to the fact that the previously mentioned angle-dependent cross term is eliminated and only a cross term of a higher order occurs. As already mentioned, an annular transducer is used for performing this method and comprises twelve transducer elements but corresponds in all other respects to the transducer illustrated in FIG. 1. The individual transducer elements are symbolically indicated by numbers in blocks in the transmitter and receiver circuits illustrated in FIGS. 4 and 5.

Figure 4:
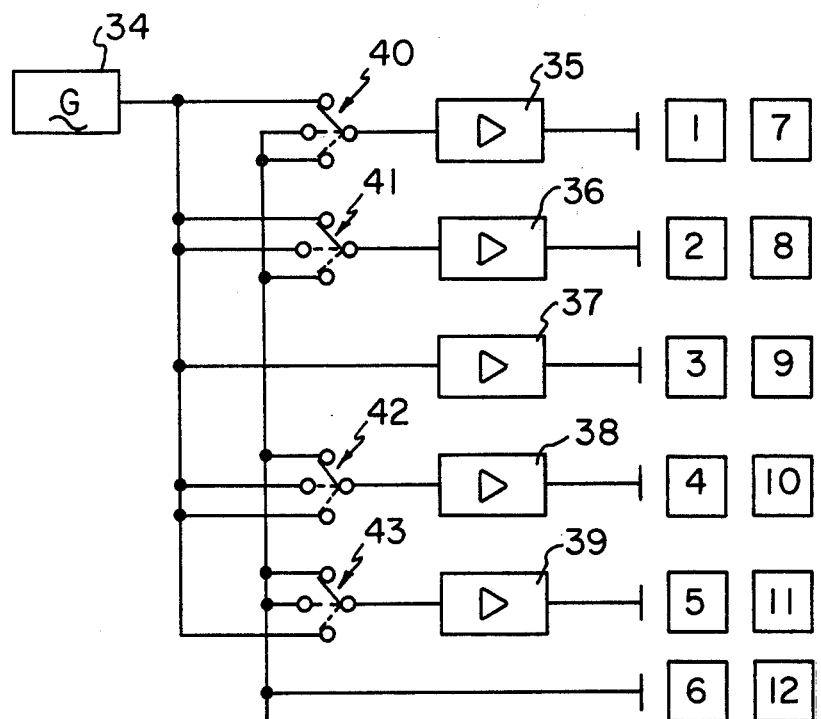
FIG. 4 is a block diagram of a transmitter circuit for a twelve-part ultrasonic transducer.

The transmitter circuit shown as a block diagram in FIG. 4 is constructed in accordance with the same principles as those of the simpler transmitter circuit for the eight-part transducer. A generator 34 produces the signal which drives the transducer elements. The said generator is connected to an amplifier 37 and, via switches 40 to 43, to amplifiers 35, 36, 38 and 39. The switches 40 to 43 have three different switching stages and are simultaneously operated. All switches 40 to 43 are in the upper position for transmitting the first pulse-defined ultrasonic wave, they are in the middle position for transmitting the second wave and in the lower position for transmitting the third wave. Only the transducer elements 1, 2, 3, 7, 8 and 9 are driven for the first pulse, only the transducer elements 2, 3, 4, 8, 9 and 10 are driven for the second pulse and only the transducer elements 3, 4, 5, 9, 10 and 11 are driven for the third pulse. Accordingly, the ultrasonic fields have a defined amplitude A or the standardized amplitude 1 in the sectors which correspond to the driven elements and in the remaining sectors they will have the amplitude 0.

Figure 5:
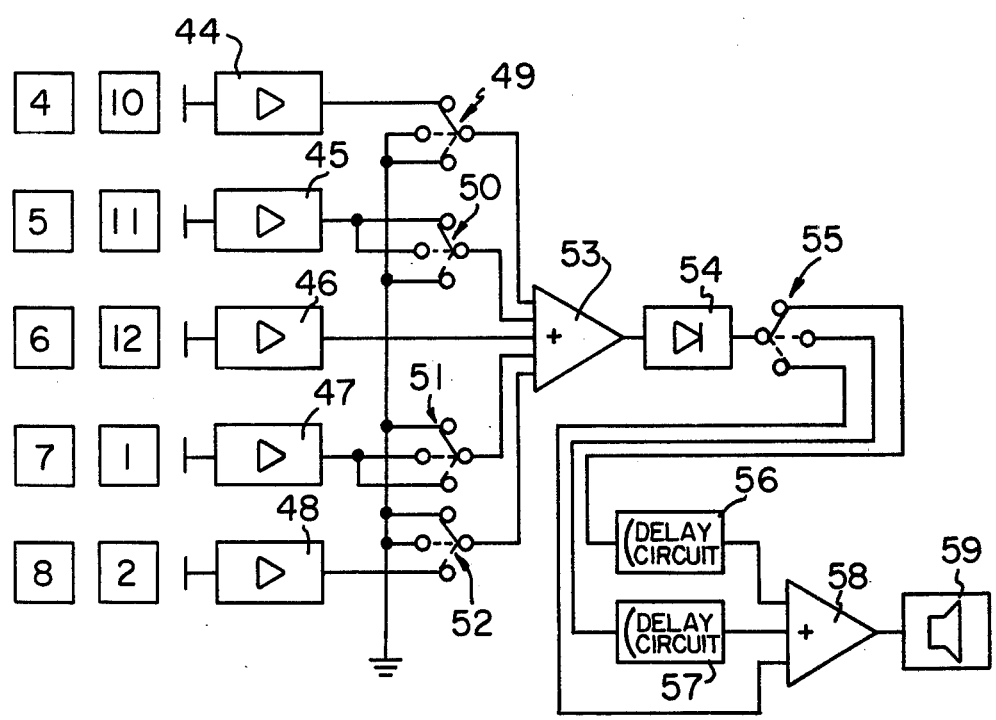
FIG. 5 is a block diagram of a receiver circuit for a twelve-part ultrasonic transducer.

In the associated receiving circuit illustrated in FIG. 5 the transducer elements are connected to the amplifiers 44 to 48 in the same grouping as that which applies to the transmitter circuit. Only the transducer elements 3 and 9 are not taken into account. The amplifier 46, which is associated with the transducer elements 6 and 12, is directly connected to one input of an adding circuit 53 while the amplifiers 44, 45, 47 and 48, which are associated with the remaining transducer elements, are connected via 49 to 52 to separate inputs of the adding circuit 53. The switches 49 to 52 also have three switch positions and are switched simultaneously with the switches 40 to 43. The three switch contacts of each switch are connected to the associated amplifier outputs or to earth respectively so that the adding circuit 53 is supplied only with the echo signal from the transducer elements 4, 5, 6, 10, 11 and 12 for the echo of the first transmitted pulse, only with the echo signals from the transducer elements 1, 5, 6, 7, 11 and 12 for the echo from the second transmitted pulse and only the echo signals from the transducer elements 6, 7, 8, 12, 1 and 2 for the echo from the third transmitted pulse. The output of the adding circuit 53 is connected to a switch 55 via a rectifier circuit in which the addition signals are rectified. The switch 55 also has three switch positions and is switched simultaneously with the remaining switches. The switch 55 is in the upper switch position for the echo signal from the first transmitted pulse and therefore supplies the rectified signal to a delay circuit 56 in which the signal is delayed or stored until the echo from the third transmitted pulse arrives. The switch is in the middle position for the echo signal from the second transmitted pulse and transfers the echo signal to a further delay circuit 57 in which the signal is also delayed or stored until the third echo signal arrives. When the third echo signal is received the switch 55 is in the lower switch position and therefore transfers the echo signal directly to one input of an adding circuit 58. The two other echo signals from the delay circuits 56 and 57 arrive at two further inputs of the adding circuit 58 simultaneously with the arrival of the third echo signal. The three echo signals are added and are displayed on a cathode ray oscilloscope 59.

Further improvements are obtainable by further subdivision of the annular ultrasonic transducer and by correspondingly more complex transmitter and receiver circuits. Other quantatized methods are also possible, for example where the amplitude of the transmitted signal assumes only the values of $+A$ and $-A$ and the received echoes are multiplied by the amplitude factor $+1$ or $-1$. These methods however suffer from the disadvantage that they call for the transmission of an additional pulse with which all elements oscillate in phase to obtain a proportional $J_0^2(cr)$ point reply. Many modifications are also feasible in the transmitter and receiver circuits. For example in some circumstances it may be possible to dispense with the delay circuits 31 or 56 and 57 respectively as well as with the adding circuits 32 and 58 if the oscilloscope display is photographically recorded. The addition of successively arriving echo signals is then in practice performed in the firm material.

The two receiver circuits illustrated with reference to FIGS. 3 and 5 therefore represent simplified embodiments since they contain simple rectifier circuits for rectifying the echo signals. These simplified circuits yield useful results in the investigation of simple objects. To investigate complicated structures it is frequently advantageous to provide for phase-corrected rectification in place of simple rectification. A correspondingly modified receiver circuit for the eight-part ultrasonic transducer is illustrated in FIG. 6. The output of the adding circuit 28 is connected to the inputs of two multiplier circuits 60 and 63 whose second inputs are supplied with the signals $\cos \omega t$ and $\sin \omega t$. The output of the multiplier circuit 60 is connected to a switch 67 and in the switch position I thereof is connected to an adding circuit 62 via a delay circuit 61 and in its other switch position II it is connected directly to an adding circuit 62. The output of the multiplier circuit 63 is connected in like manner via a switch 68 and in the position I thereof via a delay circuit 64 to an adding circuit 66 and directly to the said adding circuit 66 in the switch position II. The outputs of the two adding circuits 62 and 66 are connected to a computer circuit 69 which forms the root from the sum of the squares of the two added signals. The output of the computer circuit 69 is connected to the cathode ray oscilloscope 33.

Another embodiment of a receiver circuit with phase-corrected rectification for the eight-part ultrasonic transducer is illustrated in FIG. 7. The output of the adding circuit 28 is connected to a multiplier circuit 70 whose second input can be supplied optionally via a switch 71 with the signal $\cos \omega t$ or $\sin \omega t$. The output of the multiplier circuit 70 is connected via a switch 72 and in the position I thereof via a delay circuit 73 to both inputs of an adding circuit 74 or directly to the said inputs in the switch position II. The output of the adding circuit 74 is connected to a rectifier circuit 75 and the output is connected to the input of the cathode ray oscilloscope 33. Each of the multipliers 60, 63 and 70 contain a low-pass filter for eliminating the frequency band around twice the transmission frequency.

In the receiver circuit illustrated in FIG. 7 the switch 71 remains in position A for two successive pulses while the switch 72 remains in position I for the first pulse and in position II for the second pulse. The switch 71 is moved into switch position B for two further pulses and the switch 72 is again set to I for the first pulse and to II for the second pulse. The sum of the absolute values of the two added signals which are obtained from the first pulse pair and the second pulse pair are displayed with this reception circuit on the cathode ray oscilloscope 33, the said sum being approximately equal to the root of the sum of the squares.

In addition to the above described embodiment of the apparatus for performing the method according to the invention it is also possible to use other forms of apparatus, special attention being drawn to one possibility. Most forms of ultrasonic fields can also be produced by suitable energising of transducer elements arranged in a matrix or so-called "array". A two-dimensional system of approximately $200 \times 200 = 40,000$ elements is required to obtain resolution and an image field for the described embodiment. Such an arrangement is not yet available with the present technology but will probably be possible in the near future. Another possibility is to construct an annular transducer from approximately $2 \times 200 = 400$ elements. The ultrasonic beam can then be electronically deflected instead of being mechanically deflected. Such a solution to the problem is at the limit of present day technology but does not yet appear to be economically justifiable.

We claim:

1. An ultrasonic echo sounding apparatus for reducing the echos from reflectors outside the focal line in an echo sounding method comprising a substantially annular ultrasonic transducer having a plurality of segmental transducer elements, whose radiation surfaces are inclined towards the ring axis, a transmitter circuit with a generator and a group of switches for the optional connection of selected transducer elements to the generator or to earth, a receiver circuit with an adding circuit, a rectifier circuit, an optionally switched storage device for storing the pulses which are received earlier, a second adding circuit, indicator or recording means and a group of simultaneously actuated switches for the optional connection of selected transducer elements or earth to the first adding circuit.

2. An apparatus as claimed in claim 1, wherein the ultrasonic transducer comprises eight transducer elements, the switches of the transmitter circuit are connected to the generator so that in their first switch position two adjacently disposed ultrasonic transducer segments and those disposed opposite thereto are connected to the generator while the remaining segments are connected to earth and in the second switch position the drive is displaced by 45° relative to the first switch position and the switches in the receiver circuit connect the transducer elements that are not driven by the transmission circuit to the adding circuit.

3. An apparatus as claimed in claim 1, wherein the annular ultrasonic transducer comprises twelve segments, the switches have three switch positions, the switches of the transmitter circuit in the first switch position thereof are adapted to connect three adjacently disposed transducer elements and these disposed opposite thereto to the generator and to connect the remaining transducer elements to earth, the said switches being adapted in the second switch position thereof to rotate the drive through 30° and to rotate the drive through 60° in the third switch position and that the switches in the receiver circuit connect the transducer elements that are not driven by the transmitter circuit to the adding circuit.

4. An apparatus as claimed in claim 1, wherein the rectifier circuit is a circuit for phase-corrected rectification.

5. An apparatus as claimed in claim 4, wherein the circuit for the phase-corrected rectification contains two parallel channels each with a multiplier and connected to the adding circuit for multiplying the adding echo signals with $\sin \omega t$ and $\cos \omega t$, one adding circuit and delay circuits which can be optionally switched between the multiplier and the associated adding circuit, and a computer circuit for forming the root from the sum of the squares of the signals in both channels.

6. An apparatus as claimed in claim 4, wherein the circuit for the phase-corrected rectification contains a multiplier which is connected downstream of the first adding circuit and is provided for the optional multiplication of the added signal by $\sin \omega t$ or $\cos \omega t$ and a rectifier which precedes the cathode ray oscilloscope.

7. Apparatus as claimed in claim 1 wherein said segments are identically sized.

8. An ultrasonic echo sounding apparatus for reducing the echoes from reflectors outside the focal line in an echo sounding method, which apparatus includes a substantially annular ultrasonic transducer having a plurality of segmental transducer elements whose radiation surfaces are inclined towards the ring axis, the apparatus further comprising:
 means for transmitting an ultrasonic field which is in phase and has a uniform amplitude value A at selected transducer elements and an amplitude value different from A in the remaining transducer elements;
 means for weighting echoes received from selected transducer elements with a uniform amplitude factor; and
 means for adding to each other weighted echoes which are associated with echoes having the same transit time.

9. Apparatus according to claim 8, wherein the transmitted ultrasonic field has the amplitude A in selected transducer elements and the amplitude 0 in the remaining transducer elements, and wherein the echoes received in the selected transducer elements are weighted by the amplitude factor 0 and the echoes received in the remaining transducer elements are weighted by the amplitude factor 1.

10. An ultrasonic echo sounding apparatus for reducing the echoes from reflectors outside the focal line in an echo sounding method comprising a substantially annular ultrasonic transducer having a plurality of segmental transducer elements whose radiation surfaces are inclined towards the ring axis, a transmitter circuit with a generator and a group of switches for the optional connection of selected transducer elements to the generator or to earth, a receiver circuit with a first adding circuit, a rectifier circuit, an optionally switched storage device for storing the received echoes during at least one period elapsed between the transmission of two ultrasonic pulses, a second adding circuit, indicator or recording means, a group of simultaneously actuated switches for the optional connection of selected transducer elements or earth to the first adding circuit and control means for controlling the alternation between transmission and reception intervals and the positions of the switches, these positions cycling through at least two different switch configurations during at least two successive receiving periods for causing the addition of at least two echo sequences obtained with different switch configurations such that echoes with the same transmit time are added.

* * * * *